(12) United States Patent
Strieby et al.

(10) Patent No.: US 10,054,980 B2
(45) Date of Patent: Aug. 21, 2018

(54) MOTOR SKILL ASSISTANCE DEVICE

(71) Applicant: York Technical College, Rock Hill, SC (US)

(72) Inventors: Karl Alan Strieby, Rock Hill, SC (US); Marie Michelle Kelly, Rock Hill, SC (US)

(73) Assignee: York Technical College, Rock Hill, SC (US)

( * ) Notice: Subject to any disclaimer, the term of this patent is extended or adjusted under 35 U.S.C. 154(b) by 286 days.

(21) Appl. No.: 14/998,702

(22) Filed: Feb. 5, 2016

(65) Prior Publication Data

US 2017/0025036 A1 Jan. 26, 2017

Related U.S. Application Data

(60) Provisional application No. 62/282,192, filed on Jul. 25, 2015.

(51) Int. Cl.
*G09B 21/00* (2006.01)
*G06F 1/16* (2006.01)
*A47B 23/04* (2006.01)

(52) U.S. Cl.
CPC .......... *G06F 1/1607* (2013.01); *G06F 1/1601* (2013.01); *G06F 1/1626* (2013.01); *G06F 1/1632* (2013.01); *A47B 2023/049* (2013.01); *G06F 2200/1612* (2013.01); *G09B 21/00* (2013.01)

(58) Field of Classification Search
USPC ........ 434/112, 166, 247, 258, 227; 248/118, 248/118.1, 118.5
See application file for complete search history.

(56) References Cited

U.S. PATENT DOCUMENTS

| | | | | |
|---|---|---|---|---|
| 1,277,169 | A | * 8/1918 | Anderson | .......... A47B 21/0371 248/118.3 |
| 4,670,743 | A | * 6/1987 | Zemke | ................ G06F 3/03548 341/31 |
| 5,097,425 | A | 3/1992 | Backer | |

(Continued)

*Primary Examiner* — Kurt Fernstrom
(74) *Attorney, Agent, or Firm* — Charles G Parks

(57) ABSTRACT

A device for assisting individuals having impaired motor skill to actuate a selectable region of touch screen input of a portable computing device. The touch screen is secured in a housing, which includes an operator hand support structure. The hand support include a member for placement of the palm of the operator and allowing the palm to move the hand support structure to a selectable one of a plurality of regions of the touch screen and pivot downwardly to assist the operator to touch activate the touch screen input at the selected region. The device further includes a faceplate, which is positionable over the touch screen and has openings corresponding to the input regions of the touch screen input without interfering with the movement of the hand support. The sidewalls of the faceplate are of sufficient height to assist the operator's actuation of the intended region of the touch screen and inhibiting the operator from unintentional actuation of an adjacent region. The housing still further includes tabletop support for positioning the touch screen input at one of a plurality of selectable angles to facilitate ease of operation. The tabletop support can be repositioned to enclose the touch screen input.

13 Claims, 7 Drawing Sheets

(56) References Cited

U.S. PATENT DOCUMENTS

| | | | |
|---|---|---|---|
| 5,104,073 A * | 4/1992 | VanBeek | A47B 21/0371 248/118.3 |
| 5,108,057 A * | 4/1992 | Dandy, III | A47B 21/0371 248/118 |
| 5,193,772 A * | 3/1993 | Johnston | B43L 5/002 248/118.5 |
| 5,386,957 A * | 2/1995 | Miller | A47B 21/0371 248/118.5 |
| 5,398,896 A * | 3/1995 | Terbrack | A47B 21/0371 248/118 |
| 5,470,036 A * | 11/1995 | Vu | A47B 21/0371 248/118.5 |
| 5,685,719 A * | 11/1997 | Bressler | A61F 4/00 108/103 |
| 5,881,976 A * | 3/1999 | Gutowski | A47B 21/0371 248/118.1 |
| 6,151,012 A | 11/2000 | Bullister | |
| 6,225,920 B1 | 5/2001 | Dayle | |
| 6,384,743 B1 | 5/2002 | Vanderhelden | |
| 6,488,244 B2 * | 12/2002 | Ruan | A47B 21/0371 248/118.1 |
| 6,518,987 B1 | 2/2003 | Crevasse | |
| 6,856,333 B2 | 2/2005 | Ullmann | |
| 7,389,232 B1 | 7/2008 | Bedford | |
| 7,446,669 B2 | 11/2008 | Liebermann | |
| 7,659,836 B2 | 2/2010 | Novak | |
| 8,296,686 B1 | 10/2012 | Tedesco | |
| 8,786,555 B2 | 7/2014 | Bloomcamp | |
| 8,850,363 B2 | 9/2014 | Trewin | |
| 8,949,746 B2 | 2/2015 | Marzke | |
| 2002/0067282 A1 | 6/2002 | Moskowitz | |
| 2005/0145758 A1 * | 7/2005 | Chang | A47B 21/0371 248/118.1 |
| 2007/0202916 A1 | 8/2007 | Choi | |
| 2011/0063231 A1 | 3/2011 | Jakobs | |
| 2012/0105335 A1 * | 5/2012 | Suddreth | G06F 1/1601 345/173 |
| 2013/0344466 A1 | 12/2013 | Yook | |

* cited by examiner

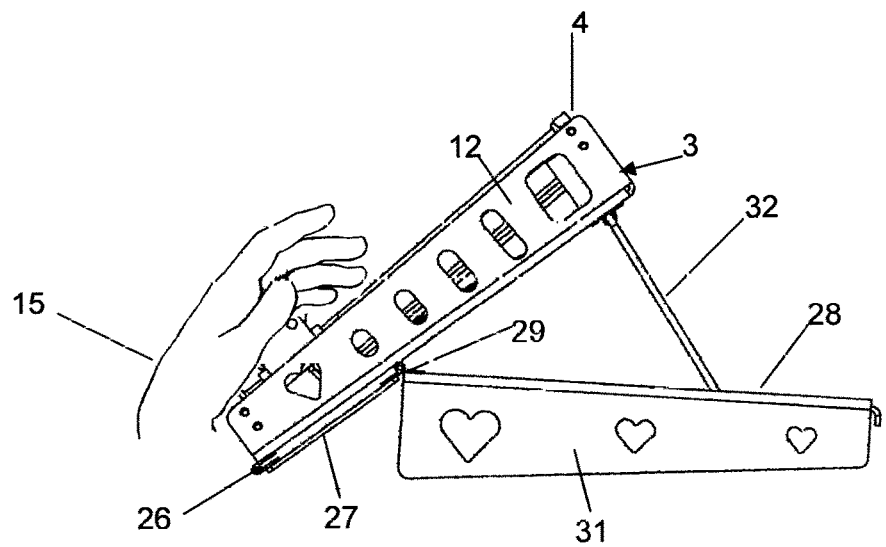
FIG. 4
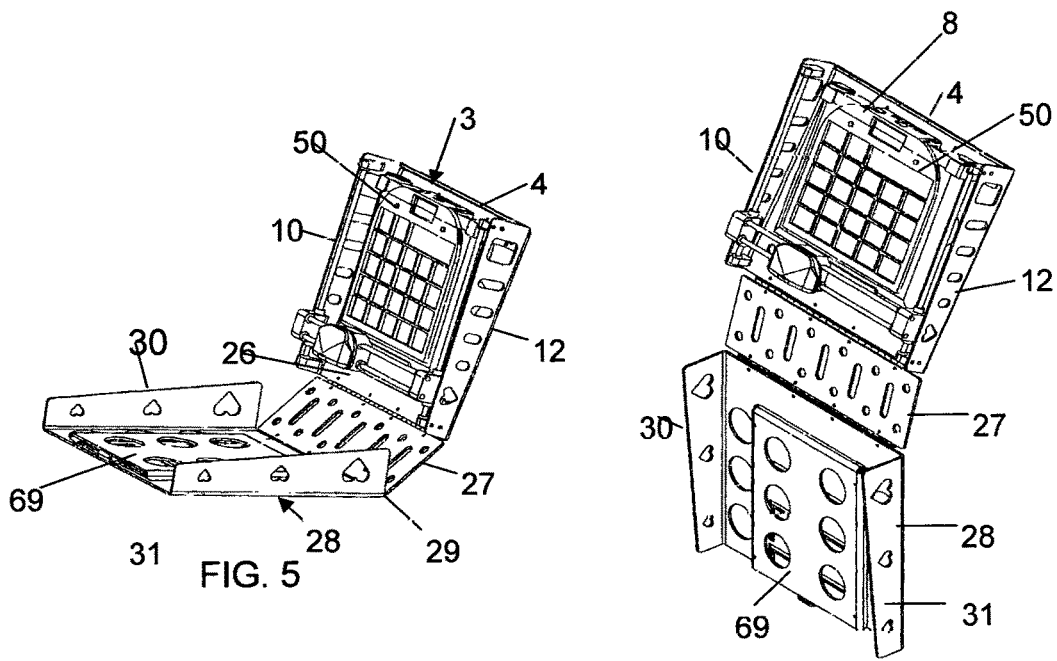
FIG. 5
FIG. 6

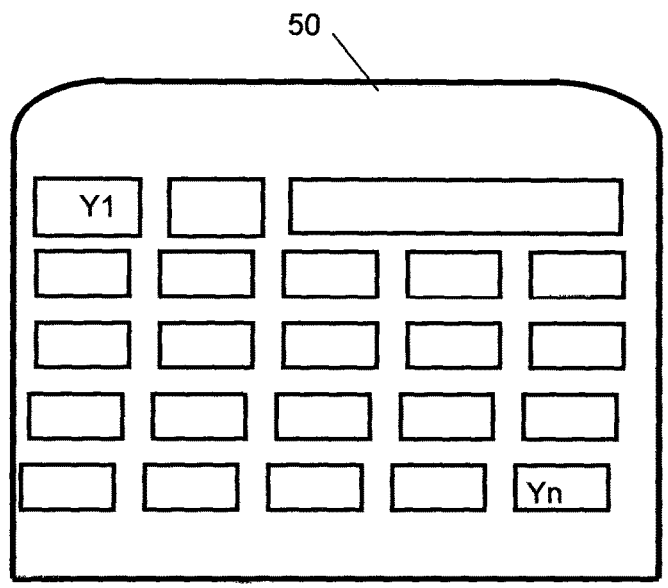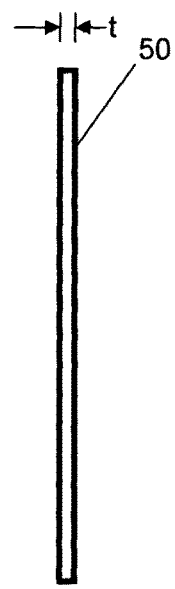
FIG. 10a
FIG. 10b
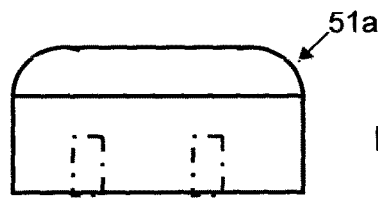
FIG. 11a
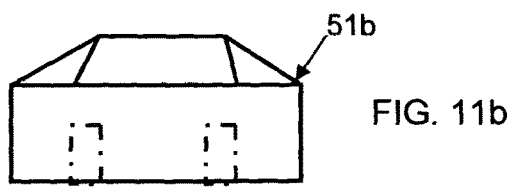
FIG. 11b
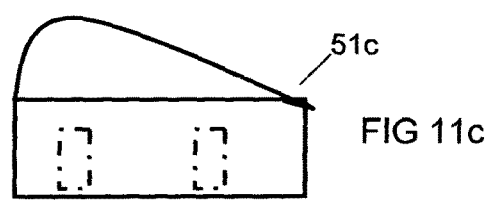
FIG 11c

MOTOR SKILL ASSISTANCE DEVICE

FIELD OF THE INVENTION

The present invention is in the technical field of electronic communication devices. More particularly, the present invention is in the technical field of devices for securing such electronic communication devices in a manner that permits operation by persons having severe mobility limitations. More particularly, the present invention is in the technical field of portable housing devices for securing electronic communication devices and including a system for allowing the actuation of the electronic communication device by operators having severe hand mobility limitations.

BACKGROUND OF THE INVENTION

There are a number of conditions in which an individual experiences impairment or a loss of the ability to communicate by verbal speech or by writing, or has decreased ability to understand written or spoken language, due to a brain injury, illness, or disease condition.

Many individuals afflicted by autism, a brain injury, stroke, or other injury caused by external forces may suffer from a severe loss of the ability to verbally communicate, in addition to a severe loss of motor skill. The partial or total inability to communicate through verbal speech or written language makes it difficult for professional caregivers and family members to ascertain the needs of the patient and to provide the appropriate care and assistance.

The ability of an individual to communicate to others varies depending on the level of disability. This is particularly important in a hospital setting or long-term care facility where there are many patients that are unable to verbally communicate with the health care providers and hospital staff, and many patients have different levels of verbal capability. The problem faced by the caregiver is magnified when the patient has severe damage to their motor function.

A wide variety of augmentative and assistive communication devices have been developed for use by individuals having differing degrees of verbal communication skills. A number of portable, "text-to-speech" communication devices are available. For those individuals that do not have the motor capability to use a keyboard, scanning communication devices are also available. The proficient use of these devices is dependant on the motor skills of the patient.

One such group of devices utilizes a laptop type of device, which is principally intended for persons who have severe limitation to their verbal communication ability. These devices generally include a touch screen divided in to zones. Each zone has a pictorial or script representation of a communication request or response of the patient. In order to communicate, the patient touch activates the corresponding zone, which represents the desired communication. Upon actuation, the device produces an audible expression of the represented depiction request or response. However, these devices are limited to persons having sufficient motor control to appropriately target the desired zone independently of assistance.

SUMMARY OF THE INVENTION

The present invention provides an assembly for securing a communication device having a touch activated screen and providing means for placing the communication device at a selectable angle relative to a patient-operator and providing means of assisting targeting of the desired zone by the patient-operator.

In one embodiment of the invention, a foldable housing encloses a communication device. When opened the top portion of the housing provides a tabletop stand. The bottom of the housing can be pivoted along a hinge assembly in a manner to provide support at a selectable angle relative to the top portion. The communication device is securely mounted inside the housing to the bottom portion. A hand support pad is slidably mounted to a rail system, which allows the hand support pad to easily traverse across the touch screen of the communication device to any desired location perpendicular to the touch screen. The hand support pad include a biasing element which, in a neutral position, biases the hand support pad in a upward position relative to the touch screen of the communication device and allows the hand support pad to traverse over the touch screen without obstruction. The hand support pad can be pivoted downwardly by an operator's wrist action to bring the operator's finger into contact with a desired area or zone of the touch screen. The degree of tensional, compressional, or torsional force required to rotate the hand support pad is selectable by the choice of the biasing element to match the capabilities of the patient-operator.

In a further embodiment of the invention, a faceplate is detachable mounted to the communication device or the housing over the touch screen. The faceplate has a plurality of openings. Each opening is positioned over a respective zone of the touch screen. The thickness of the faceplate around its openings provides a means of preventing the operator from actuating an unintended area of the touch screen by constricting lateral movement of the operator's finger within the selected opening and, thereby the patient-operator can better target the intended area of the touch screen.

DETAILED DESCRIPTION OF DRAWINGS

FIG. 4 is a side view of the Motor Skill Assistance Device illustrating the position of an operator's hand positioned to actuate a region of the communication device with the housing in a fully open position.

FIG. 5 is a perspective view of the housing in a quarter open position.

FIG. 6 is a perspective view of the housing in half-open positions.

FIG. 10a is a plan view of the locating grid.

FIG. 10b is a side view of the locating grid

FIG. 11a through 11c are plan views of optional hand pad suitable for attachment to the hand support brace.

DETAILED DESCRIPTION

Figure 1:
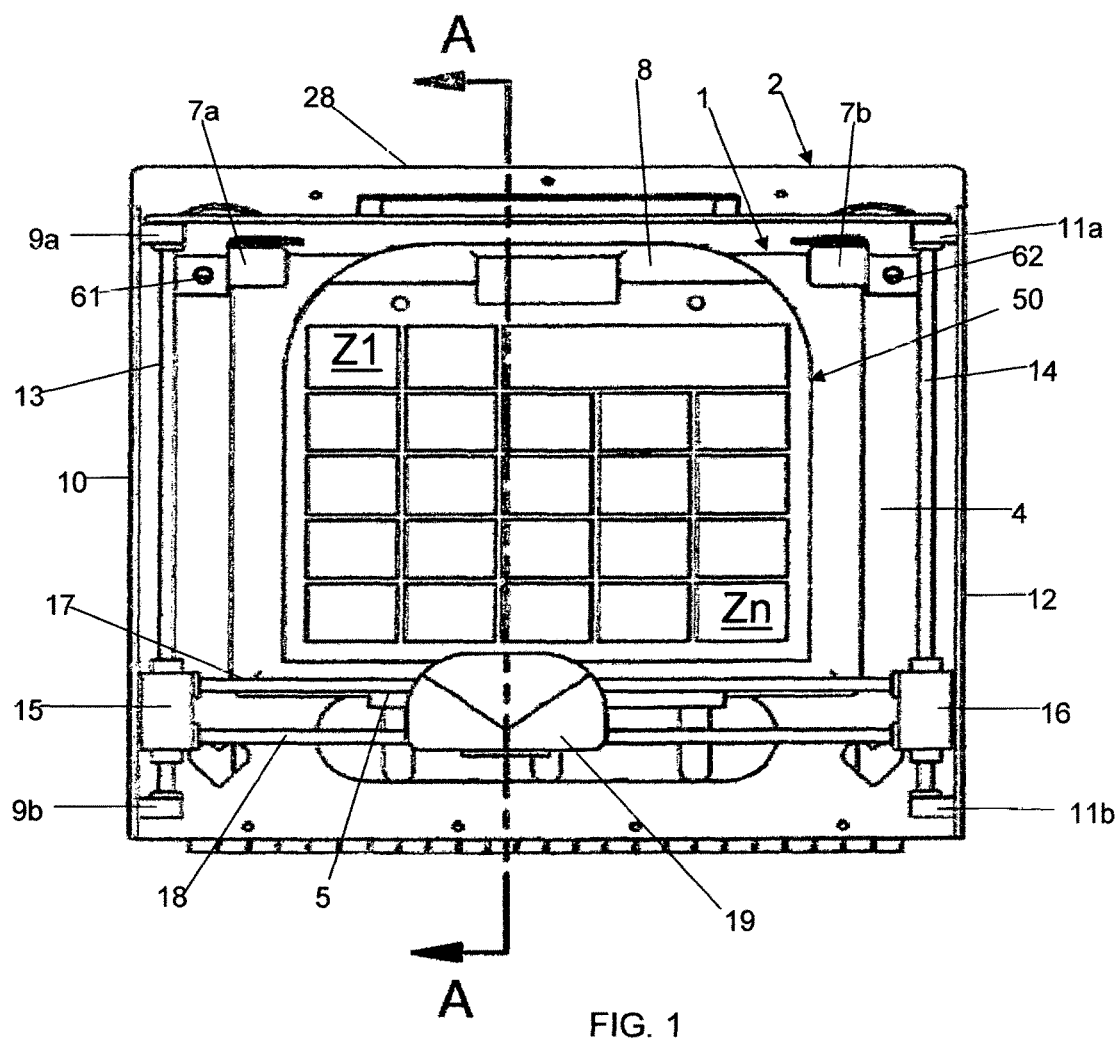
FIG. 1 is a top view of the Motor Skill Assistance Device for a portable communication device.
Figure 2:
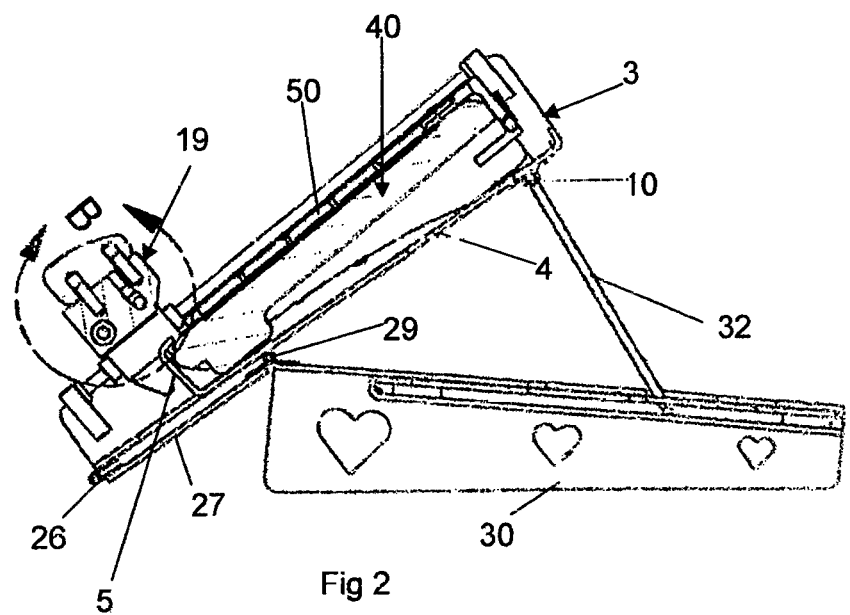
FIG. 2 is a cross sectional view of the Motor Skill Assistance Device along section A-A.

Referring to FIGS. 1 and 2, a portable communication device 1 is positioned in the Motor Skill Assistance Device 2. The motor skill assistance device 2 is particularly suited to an operator-patient with severely reduced motor skills such that they are incapable of activating the touch zone $Z_n$ of the communication device 1 without assistance.

The Motor Skill Assistance Device 2 is comprised of a foldable housing 3, which also functions as a stand for the device 1, and storage and carrying case. The bottom plate 4 of the housing 3 has a bottom support bar 5 such that the bottom side of portable communication device 1 is supported. The bottom support bar 5 is secured to the bottom plate 4 by any suitable means or made integral to the bottom plate 4. Mounted to the top portion of bottom plate 4 to opposite sides are respectively Z shape clips 7a and 7b. As best seen in FIG. 1, respective fasteners 61 and 62, such as by adjustable fasteners, are secured to one end of the respective Z shaped clips 7a and 7b to the bottom plate 4. The Z shaped clips 7a and 7b are orientated to allow them to pivot about an axis perpendicular to the bottom plate 4 to allow the communication device 1 to be slid between the Z shaped clips 7a and 7b to rest on the bottom plate 4. Once the portable communication device 1 is in place, the lower side rests against the bottom support 5 brace. The Z shaped clips 7a and 7b can then be pivoted to restrain the communication device 1 in place on the bottom plate 4.

Along one side of the bottom plate 4, at opposing ends, are mounted respective blocks 9a and 9b, which are mounted to the sidewall 10 of the bottom plate 4 by any suitable means. Extending between and supported by the mounting blocks 9a and 9b is a rail 13 in an elevated position relative to the bottom plate 4 and the communication device 1. Along an opposing side of the bottom plate 4 are mounting blocks 11a and 11b, which are mounted to the sidewall 12 of the bottom plate 4 by any suitable means. Extending between and supported by the mounting block 11a and 11b is a rail 14 in a elevated position relative to the bottom plate 4 and communication device 1 parallel to rail 13.

The rail 13 has slide mounted to it a slide block 15, which can slide along rail 13 between mounting blocks 9a and 9b. In like manner, the rail 14 has a slide mounted to it, a slide block 16, which can slide along rail 14 between the mounting blocks 11a and 11b. Extending between the slide blocks 15 and 16 and mounted at their respective ends are rails 17 and 18. The rails 17 and 18 are positioned such that the assembly elements 15, 16, 17 and 18 can be moved as a unit along the rails 13 and 14 without obstruction by the communication device 1.

Figure 3:
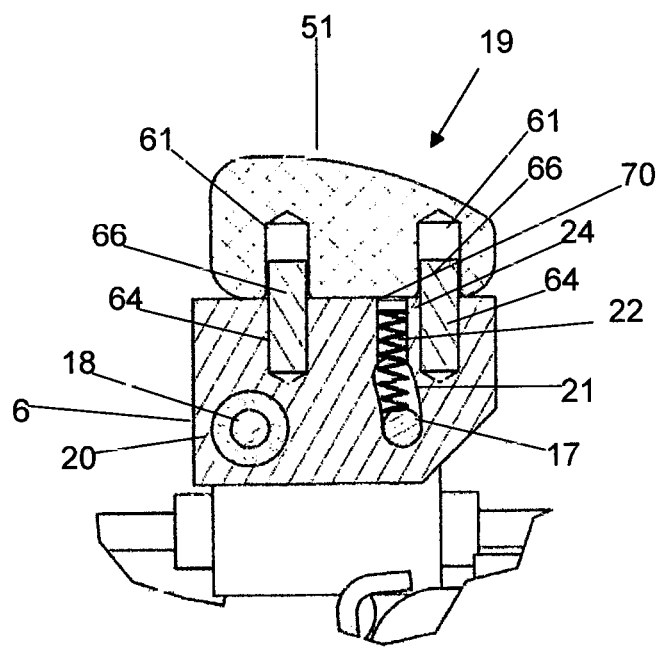
FIG. 3 is an enlarged cross sectional view along section A-A of detail area B of the hand support brace.

Referring to FIGS. 1, 2, and 3, riding along rails 17 and 18 is a hand support brace 19. The hand support brace 19 includes a base 6, which has tubular passageway 20 through which rail 18 extends and a formed channel 21 through which rail 17 extends.

Referring more specifically to FIG. 3, which is a sectional view along line A-A in the area of detail B, perpendicularly formed in the base 6 is a passageway 24 and contained in the passage way 24 is a spring 22. The passageway 24 is closed lengthwise at the top by an end plug 70. The hand pedestal 51 has a plurality of formed wells 61, which are aligned to a plurality of wells 64 formed in the base 6. Attaching pins 66 are press fit in respective wells 64 and are slip fit into respective wells 61 to detachable attach the hand pedestal 51 to the base 6.

Because the hand support brace 19 rides along rails 17 and 18, which are secured to blocks 15 and 16 at their respective ends, and blocks 15 and 16 in turn ride along respective rails 13 and 14, the hand support brace 19 can be repositioned laterally, and fore and aft to any desired location relative to the touch screen 40 of the communication device 1. Because of the bias of the spring 22, the support brace 19 is free move above the touch screen 40 and pivot about rail 18.

Referring to FIG. 4, if one wishes to activate a region of the touch screen 40, one can position their hand 15 on the hand support brace 19. By placing, one's hand on the hand support brace 19 one can position the hand support brace 19 over any desired region of the touch screen 40 and with an action of the wrist to cause the hand support brace 19 to pivot about rail 18 to bring their finger into contact with the selected region of touch screen 40.

Referring to FIGS. 5 and 6, along the bottom edge of the bottom plate 4 of the housing 3 is mounted a piano hinge 26 which joins the bottom plate 4 to a side plate 27. The piano hinge 26 can be secured to the bottom plate 4 and side plate 27 by any suitable means such as by rivets. The opposite side of the side plate 27 is affixed to a top cover 28, in like manner, by a second piano hinge 29. In this manner, the top cover 28 can be folded over to provide an enclosure such that the sides 30 and 31 of the top cover 28 meet respective sides 10 and 12 of the bottom plate 4.

Referring to FIGS. 7, 8, 9 and 12, pivotally mounted to the underside of the bottom plate 4 is U-shaped support rod 32 with its respective ends directed inwardly. The ends of support rod 32 are pivotally captured in formed brackets 53 and 54 attached by any suitable means to bottom plate 4. The top cover 28 has a series of slots 36 through 39 formed therein and aligned to selectively receive the bottom portion of the support rod 32 such that the angle between the bottom plate 4 and the top cover 28 can be selectively changed between one of four positions. In the fully open position, the top cover 28 serves as a table top base.

The underside of the top cover 28 includes an elongated U-shaped member 69, mounted by any conventional means and positioned to enclose the slots 36 through 39, to form a channeled opening 43. Positioned lengthwise within the channel are first and second set of guide members 41 and 42, respectively, mounted by any conventional mean to respective sides of the top cover 28.

Figure 7:
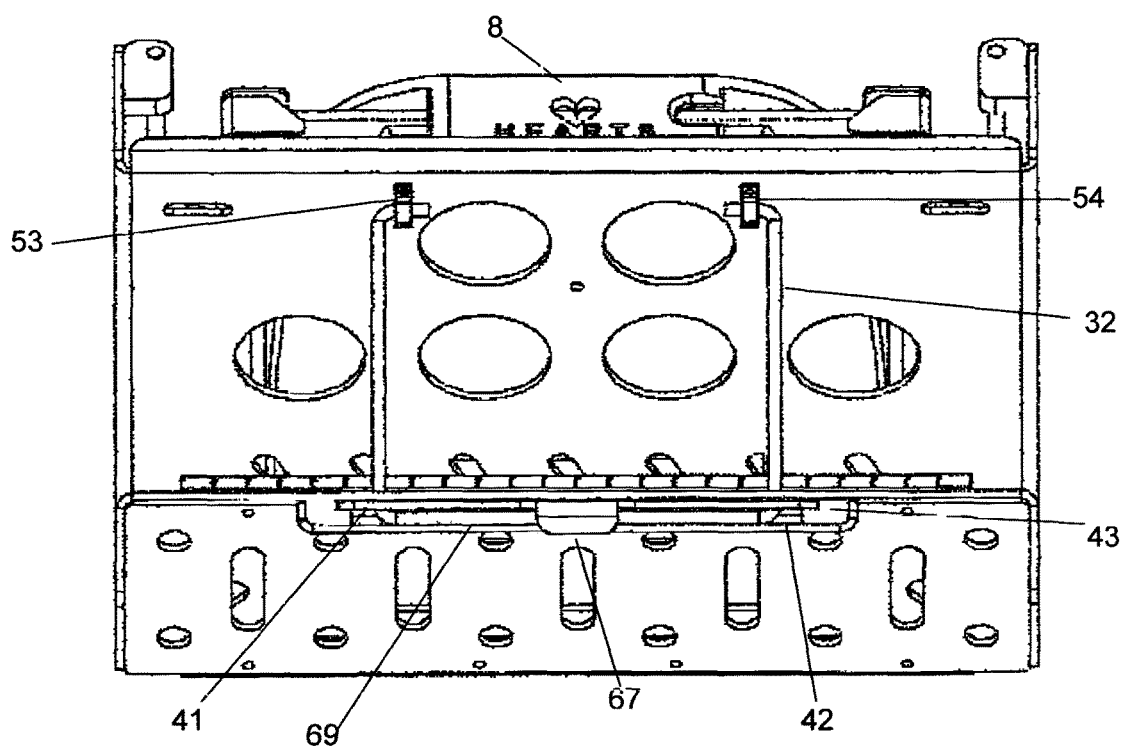
FIG. 7 is a rearward facing view of the Motor Skill Assistance Device.
Figure 8:
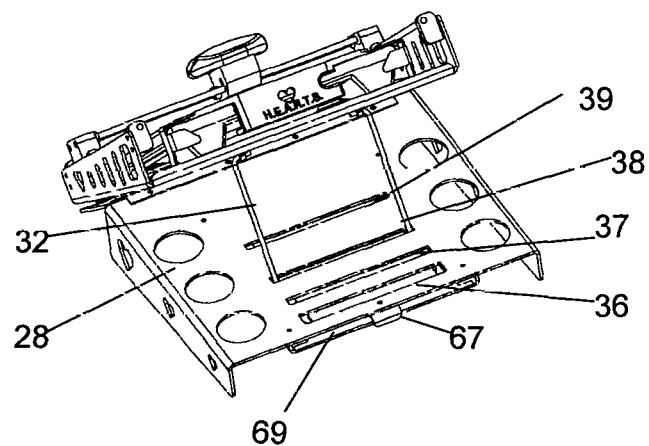
FIG. 8 is a rearward perspective view of the Motor Skill Assistance Device in an open position
Figure 9:
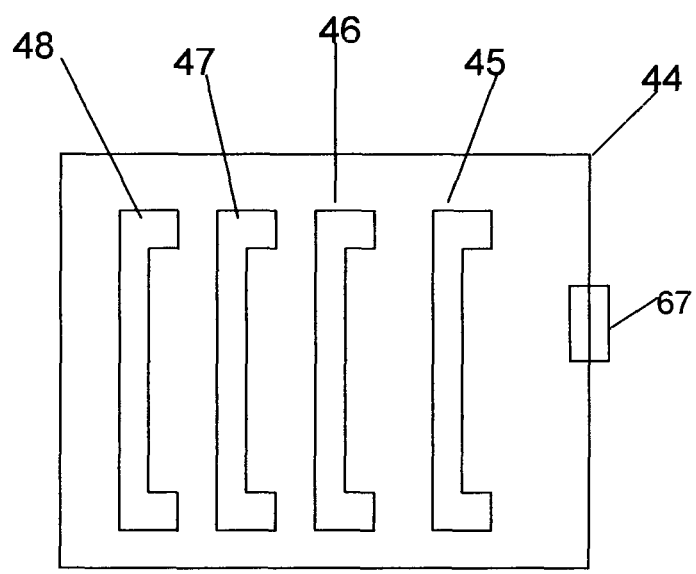
FIG. 9 is a plan view of the locking plate.
Figure 12:
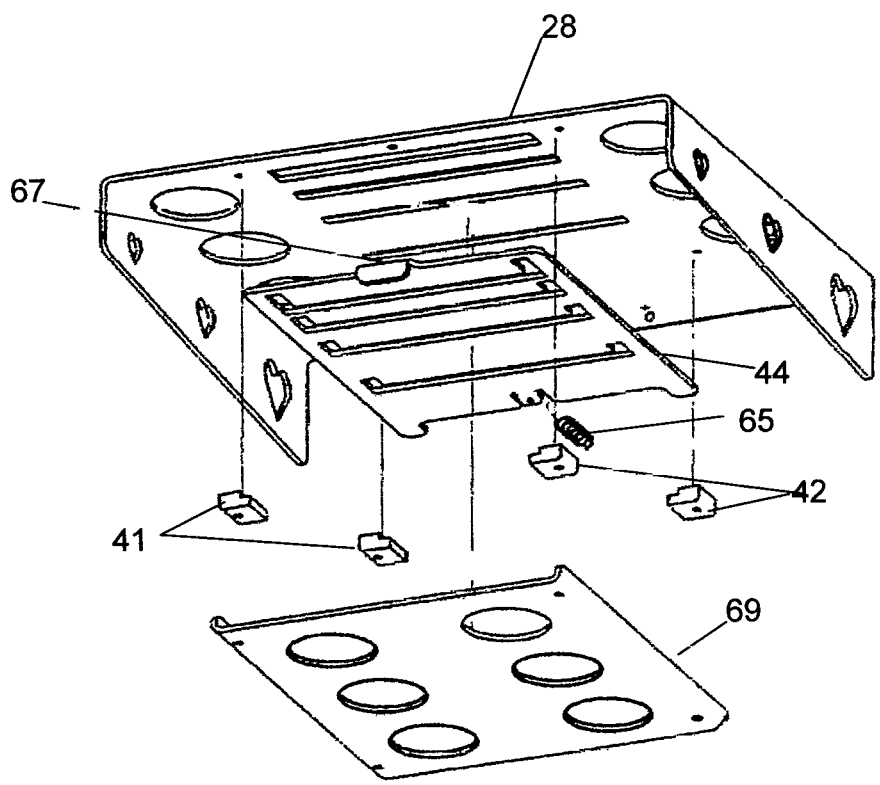
FIG. 12 is an exploded view of the locking assembly.
Figure 13:
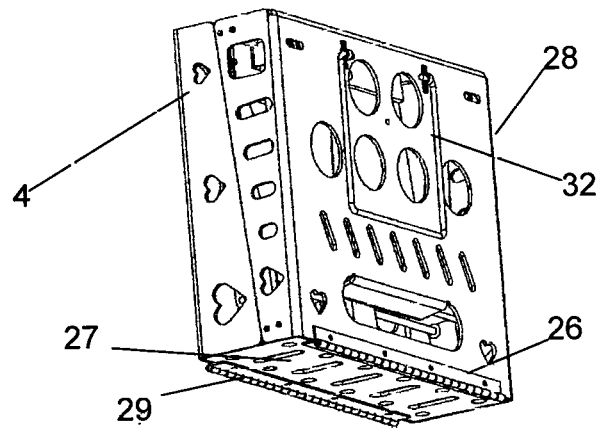
FIG. 13 is a perspective view of the Motor Skill Assistance Device in the closed position.

Referring more specifically to FIGS. 7, 9, and 12, a locking plate 44 includes elongate U-channel openings 45, 46, 47, and 48. The locking plate 44 is sized to be accepted within the channel opening 43 and fit between and slide between and along the guide members 41 and 42. The U-channel openings 45 through 48 are positioned on the locking plate 44 such that they can be aligned to the slots 37 through 39, respectively, and such that the bottom portion of the support rod 32 can pass through the selected slot 36 through 39 and, correspondingly, U-channel openings 45 through 48. The bottom portion of support rod 32 can than rest on the inner face of member 69. The locking plate 44 can be slidable manipulated such that the bottom corners of brace 32 are locked into lateral portions of the U-channel openings 45 through 48. The locking plate 44 can be secured into locking position by spring 65, which is secured at one end to a receiving hole in the locking plate 44 and at the other end to the receiving hole in the top cover. To release the support rod 32, the locking plate 44 is moved rearward, by pulling on formed tab 67, to again align slots 36 through 39 to respective slots 45 to 48, which will allow brace 32 to be withdrawn from the channel 43. The housing 3 can then be folded into a closed position as best seen in FIG. 13.

Referring to FIG. 1, communication device 1 is partitioned into a number of touch sensitive zones $Z_1$ through Z. Each Zone $Z_n$ has graphically depicted a desired request or response. When the touch screen 40 is touch activated the communication device 1 produces an audible expression representative of the patient-operator's desire or response.

For example, the operator may suffer from a physical condition, which prevents the operator from directly communicating and has extremely limited mobility or dexterity in their hands. The operator may position his or her hand on the hand support 19 or with a caregiver's assistance have his hand placed over the hand support 19. The operator can then move the hand support 19 over the desired zone and with minimal effort flex, his or her wrist to finger activate the desired zone.

Referring to FIGS. 1, 2, and 10, a removable faceplate 50 has a plurality of formed openings $Y_1$ through $Y_n$. The faceplate 50 can be positioned over the touch screen 40 of the communication device 1. The faceplate 50 can be held in position by a clamp 8, detachable mounted by any suitable means to the top portion of the communication device 1 or, in the alternative, to the bottom plate 4. The thickness T of the faceplate 50 is chosen so as not to interfere with movement of the hand support brace 19 as it traverses the communication device 1 but of sufficient thickness to prevent the inadvertent actuation of an adjacent zones $Z_n$ by the operator. The openings in faceplate $Y_n$ are positioned to reveal a corresponding $Z_n$ of the touch screen 40 of the communication device 1.

Referring to FIGS. 11a through 11c, a plurality of hand pedestals 51a through 51c, of like construction to the hand pedestal 51, may be selectively used by positioning onto the corresponding pins 66 in the hand support brace 19. Each hand pedestal 51 and 51a through 51c may be respectively shaped to accommodate unique requirements of the operator. By selecting a suitable hand pedestal 51, or 51a through 51c, the assembly can be tailored to the capabilities of the patient-operator. For example, it is not uncommon for certain patient-operators to not only have degradation of hand mobility, but also deformity of the hand. A caregiver may choose the best-suited hand pedestal 51, 51a through 51c that best suits the operator's hand.

We claim:

1. A device for assisting an operator to position the palm of an operator's hand over a desired area associated with the touch screen input of a computing device for receiving operator finger touch input, comprising:
    housing means for securely receiving said touch screen input of said computing device within a defined region of said housing means, said housing means having a bottom plate wherein said defined region is located on the upper face of said bottom plate;
    hand support means for providing support for said palm of said operator's hand thereon;
    positioning means mounted to said housing for supporting said hand support means such that said hand support means can be selectively positioned over a desired area above said defined region by said operator's hand, said positioning means having;
    a support rail means for slidably supporting said hand support means such that said hand support means is positionable across said defined region, and pivotal from a first position to a second position in close proximity to said touch screen input; and,
    a side rail means for slidably supporting said support rail means above and along side said defined region such that said hand support means is positionable over a desired area above said defined region.

2. A device as claimed in claim 1, wherein said housing means further comprises means for supporting said bottom plate of said housing selectively within an arc relative to the horizontal in one of a plurality of discrete positions.

3. A device as claimed in claim 2, wherein said means for supporting said bottom plate can be further positioned to enclose said support rail means, said side rail means and defined region.

4. A device for assisting an operator to position the palm of an operator's hand over a desired area associated with the touch screen input of a computing device for receiving operator finger touch input, comprising:
    a touch screen input of a computing device;
    a housing having a bottom plate, said bottom plate having an upper face and a bottom face;
    hand support means for providing support for said operator's hand with said operator's palm thereon;
    first rail means mounted to said housing for slidably supporting said hand support means therealong such that said hand support means is positionable along one side of the upper face of said bottom plate;
    second rail means mounted to said housing for slidably supporting said hand support means therealong such that said hand support means is positionable along an opposing side of the upper face of said bottom plate in coordination with said first rail means, to locate a defined region between said first rail means and said second rail means;
    said hand support means having a third rail means mounted to and slidably positionable along said first rail means and said second rails means and extending between said first rail means and second rails means such that said third rail means is elevated above said defined region of said upper face of said bottom plate;
    said hand support means further having a base slidably mounted to said third rail means such that said base is selectively positionable along said third rail means and pivotal about said third rail means; and,
    means for securely receiving said touch screen input to said upper face of said bottom plate below said hand support means such that said hand support means is positionable over any portion of said touch screen input.

5. A device as claimed in claim 4 wherein said first rail means includes:
    a first mounting block fixably mounted to said bottom plate;
    a second mounting block fixably mounted to said bottom plate; and,
    a first elongated rail fixably mounted at one end to said first mounting block and at the opposite end to said second mounting block.

6. A device as claimed in claim 5 wherein said second rail means includes:
    a third mounting block fixably mounted to said bottom plate;
    a fourth mounting block fixably mounted to said bottom plate; and,
    a second elongated rail fixably mounted at one end to said third mounting block and at the opposite end to said fourth mounting block.

7. A device as claimed in claim 6, wherein said third rail means includes:
    a first slide block slidably mounted to said first rail;
    a second slide block slidably mounted to said second rail; and,
    a third rail extending between said first and second rails and fixably mounted at its ends to said respective first and second slide blocks.

8. A device as claimed in claim 7, wherein said third rail means of said hand support means includes:

a fourth rail extending between said first and second rails and fixably mounted at its ends to said respective first and second slide blocks and extending parallel to said third rail;

said base having a first transverse opening through which said third rail slidably extends therethrough;

said base further having a second transverse opening having a generally U-shape and extending parallel to said first transverse opening and having said fourth rail extending therethrough;

capping means for enclosing said transverse opening of said U-shaped channel; and, biasing means mounted to the lower portion of said second transverse opening to bias said fourth rail against said capping means; and, whereby said base is biased in a first position by said biasing means against said fourth rail and selectively pivotably actuated about said third rail to a second position compressing said biasing means to be in close proximity to said defined region in a second position.

9. A device as claimed in claim 4 further comprising palm support means detachably mounted to said base.

10. A device for assisting an operator to position the palm of an operator's hand over a desired area associated with the touch screen input of a computing device for receiving operator finger touch input, comprising:

a housing for receiving said touch screen input of said computing device including, a bottom plate means having a top and bottom face for receiving said touch screen input within a defined region of said top face of said bottom plate;

means for detachably securing said touch screen input to said bottom plate within said defined region;

a first elongated rail;

a first rail support means fixably mounted to said housing for supporting said first rail at the respective ends to extend parallel to one said of defined region;

a second elongated rail;

a second rail support means fixably mounted to said housing for supporting said second rail to extend parallel to the opposite side of said defined region;

a third rail;

a fourth rail;

a first slide block slidably mounted to said first rail;

a second slide block slidably mounted to said second rail, wherein said third rail extends between said first and second slide mounting blocks and is fixably mounted at its ends to respective first and second slide blocks, and said fourth rail extends between said first and second slide blocks and is fixably mounted at its ends to respective first and second slide blocks;

a base having a first traverse opening through which said third rail extends therethrough and a second transverse opening having a generally U-shape and extending parallel to said first transverse opening and having said fourth rail extending therethrough;

capping means for enclosing said transverse opening of said U-shape channel opening;

biasing means mounted in the lower portion of said second transverse opening to bias said fourth rail against said capping means; and, whereby said base is biased in a first position and selectively pivotally actuated about said third rail to a second position in close proximity to said touch screen input in a second position.

11. A device as claimed in claim 10, further comprising a touch screen input secured to said bottom plate within said defined region by said securing means, wherein said touch screen input is separated into a plurality of touch actuation regions for communicating with said computing device for generating a specific output in response to touch actuation of said selected region by the finger of said operator;

a faceplate detachably mounted to said touch screen, said faceplate having openings aligned to each of said respective input regions of said touch screen input;

said faceplate being positioned between said base of said hand support means and said touch screen input and having a thickness as not to interfere with the motion of said hand support means in the first position while transversing above said touch screen input; and, wherein positioning of said hand support means by an operator and actuation of a particular region of said touch screen is constrained by said corresponding opening of said faceplate when said hand support means is pivoted to allow operator input in a respective region of said touch screen.

12. A device as claimed in claim 11, further comprising:

a top plate having a top and bottom side;

a side connecting plate generally rectangular in shape pivotally mounted along one of its elongated edges to said bottom plate and pivotally mounted along its other elongated edge to one end of said top plate such that said top plate selectively assumes a first position above said defined region and a second position below said bottom plate;

a generally U shaped member pivotally mounted to the bottom face of said bottom plate;

said top plate having a plurality of elongated slots sized to receive the bottom portion of said U-shaped member;

an elongated channel member fixably mounted to the top side of said top plate to form an elongated channel locating said slots opposite said elongated channel member;

a locking plate having a plurality of U-shape openings sized to receive the bottom portion of said U-shaped member through a selected one of said slots in a first position and prevent withdraw of said U-shaped member in a second position; and, wherein, selectively placing said U-shaped member in one of said slots of said top plate to extend through said U-shape opening of said locking plate and repositioning said locking plate fixes the U-shaped member to said bottom plate in one of a plurality of angles relative to said top plate when said top plate is in said second position and fixes the angular position of said top plate to said bottom plate of said housing.

13. A device as claimed in claim 12, further comprising:

said top plate further having side walls formed on opposite sides partially enclosing said defined region in cooperation with said side connecting plate when said top plate is in said first position and elevating said bottom plate when said top plate is in said second position.

* * * * *